US009182648B2

(12) United States Patent
Ai et al.

(10) Patent No.: US 9,182,648 B2
(45) Date of Patent: Nov. 10, 2015

(54) TWO-DIMENSIONAL PLANAR LIGHTWAVE CIRCUIT INTEGRATED SPATIAL FILTER ARRAY AND METHOD OF USE THEREOF

(71) Applicant: Luminit LLC, Torrance, CA (US)

(72) Inventors: Jun Ai, Lakewood, CA (US); Fedor Dimov, Redondo, CA (US)

(73) Assignee: LUMINIT LLC, Torrance, CA (US)

( * ) Notice: Subject to any disclaimer, the term of this patent is extended or adjusted under 35 U.S.C. 154(b) by 130 days.

(21) Appl. No.: 14/212,822

(22) Filed: Mar. 14, 2014

(65) Prior Publication Data

US 2015/0277209 A1 Oct. 1, 2015

Related U.S. Application Data

(60) Provisional application No. 61/788,219, filed on Mar. 15, 2013.

(51) Int. Cl.
| | |
|---|---|
| *G02B 6/12* | (2006.01) |
| *G02B 6/32* | (2006.01) |
| *G02F 2/00* | (2006.01) |
| *G02B 3/00* | (2006.01) |
| *G02B 6/126* | (2006.01) |
| *G02B 6/13* | (2006.01) |

(52) U.S. Cl.
CPC ............... *G02F 2/00* (2013.01); *G02B 3/0056* (2013.01); *G02B 6/12002* (2013.01); *G02B 6/12004* (2013.01); *G02B 6/126* (2013.01); *G02B 6/13* (2013.01); *G02B 6/32* (2013.01); *G02B 2006/12109* (2013.01)

(58) Field of Classification Search
CPC .................. G02B 6/12002; G02B 2006/12102
See application file for complete search history.

(56) References Cited

U.S. PATENT DOCUMENTS

| | | | | |
|---|---|---|---|---|
| 2003/0002806 A1* | 1/2003 | Kang | ................... | G02B 6/4249 385/60 |
| 2003/0063836 A1* | 4/2003 | Lam | ................... | G02B 6/12002 385/14 |
| 2003/0081906 A1* | 5/2003 | Filhaber | ................. | C03C 27/06 385/60 |
| 2003/0231829 A1* | 12/2003 | Meyers | ................ | G02B 6/4212 385/33 |
| 2004/0004779 A1* | 1/2004 | Kochergin | ............. | B82Y 20/00 359/885 |
| 2004/0028336 A1* | 2/2004 | Feuer | ....................... | G02B 6/12 385/50 |
| 2004/0247236 A1* | 12/2004 | Yoshimura | ......... | G02B 6/12002 385/16 |
| 2007/0031108 A1* | 2/2007 | Sugita | .................... | B82Y 20/00 385/147 |
| 2015/0208144 A1* | 7/2015 | Holmes | ................... | H04J 14/02 398/48 |

* cited by examiner

*Primary Examiner* — Rhonda Peace
(74) *Attorney, Agent, or Firm* — Husch Blackwell LLP

(57) ABSTRACT

A large coherent two-dimensional (2D) spatial filter array (SFA), 30 by 30 or larger, is produced by coupling a 2D planar lightwave circuit (PLC) array with a pair of lenslet arrays at the input and output side. The 2D PLC array is produced by stacking a plurality of chips, each chip with a plural number of straight PLC waveguides. A pupil array is coated onto the focal plane of the lenslet array. The PLC waveguides are produced by deposition of a plural number of silica layers on the silicon wafer, followed by photolithography and reactive ion etching (RIE) processes. A plural number of mode filters are included in the silica-on-silicon waveguide such that the PLC waveguide is transparent to the fundamental mode but higher order modes are attenuated by 40 dB or more.

5 Claims, 8 Drawing Sheets

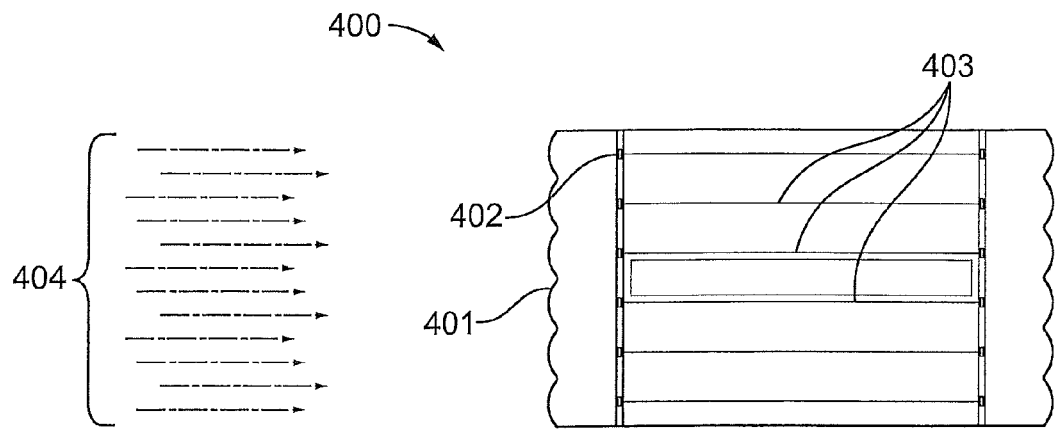
FIG. 4
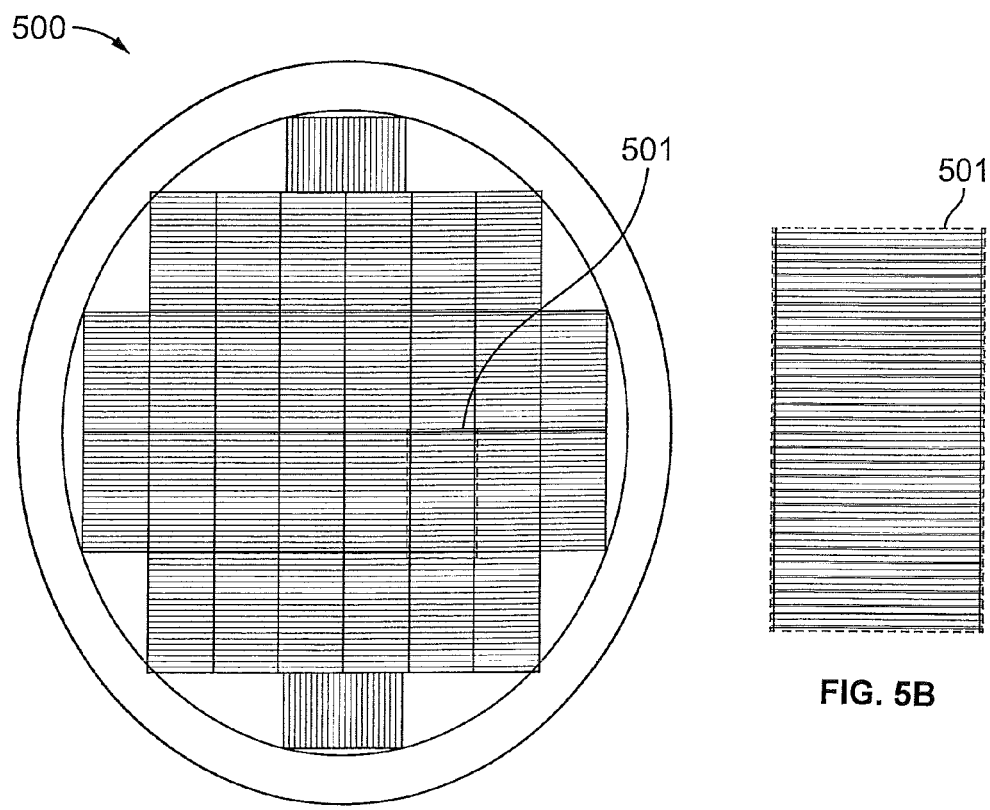
FIG. 5A
FIG. 5B

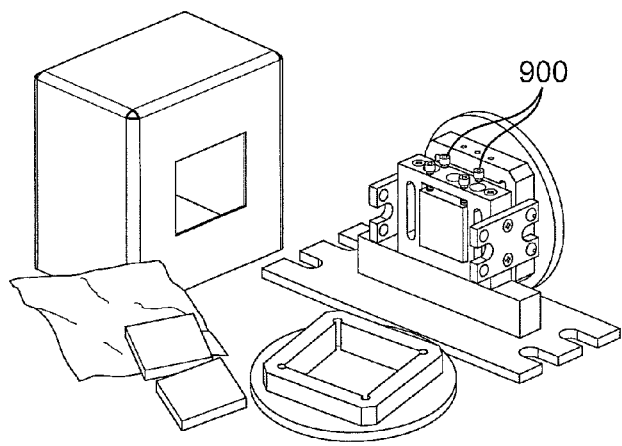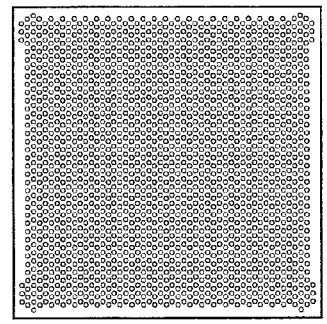
FIG. 10A
FIG. 10B
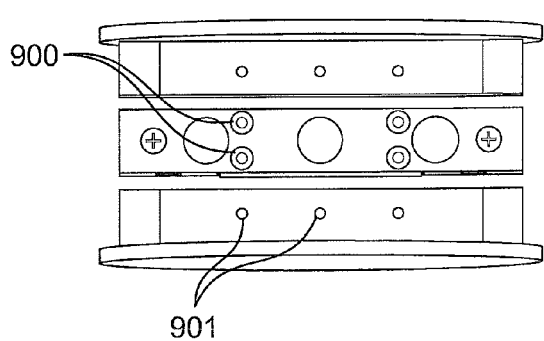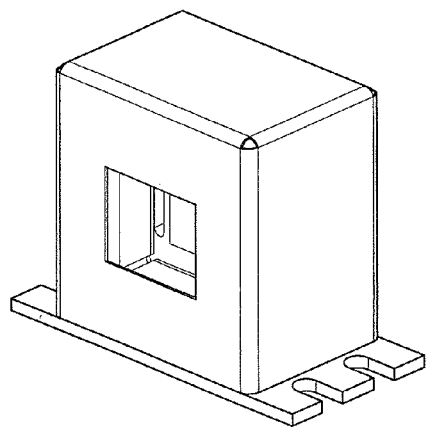
FIG. 10C
FIG. 10D

TWO-DIMENSIONAL PLANAR LIGHTWAVE CIRCUIT INTEGRATED SPATIAL FILTER ARRAY AND METHOD OF USE THEREOF

GOVERNMENT RIGHTS STATEMENT

The United States Government may have certain rights to this invention under NASA Contract No: NNX-10-C-A56C.

BACKGROUND OF THE INVENTION

The present invention relates to the art of optics. In particular, the present invention relates to optical spatial filter arrays.

Prior art spatial filter arrays, which are all based on fiber arrays or fiber bundles, include single-mode fiber arrays, photonic crystal fiber arrays, and large mode field diameter (MFD) fiber arrays that are placed inside a single large triangle groove, or 2D array of double-sided micro-fabricated silicon V grooves.

Prior art technologies are based on fiber arrays, which are problematic due to alignment difficulties with the input/output microlens arrays. The assembly and alignment process has been the big stumbling block for the fiber arrays, which makes it difficult to impossible to accomplish the actual fabrication of large arrays. For example, University of Florida fabricated a 42-channel fiber array by placing 42 single-mode fibers in double-sided silicon V-grooves [1. J. Ge, D. et al., "Development of an Extremely Coherent Single Diode Fiber Bundle Array for High Contrast Imaging of Extrasolar Planets with Visible Terrestrial Planet Finder," SPIE 5491 New Frontiers in Stellar Interferometry, pp. 628-635, 2004.]; Jet Propulsion Laboratory fabricated a 28-channel fiber array by placing 28 large mode fibers inside a triangle area surrounded by three prisms [2. D. T. Liu, et al., "Design and Fabrication of a Coherent Array of Single Mode Optical Fibers for the Nulling Coronagraph," SPIE Tech Inst for Detect of Exoplanets, pp. 217-228, 2003.]. Fiberguide developed 2D fiber arrays comprising ~200 single mode fibers, but the 2D fiber arrays have problems to align with microlens arrays. Current fiber array technologies cannot produce 30×30 or larger coherent SFAs.

Visually, referring to FIG. 1, systems developed at NASA's Jet Propulsion Laboratories (JPL) 100 are based upon a triangle gap surrounded by three prisms. About 28 singlemode fibers were placed inside the equilateral triangle area [2. D. T. Liu, et al., "Design and Fabrication of a Coherent Array of Single Mode Optical Fibers for the Nulling Coronagraph," SPIE Tech Inst. for Detect. of Exoplanets, pp. 217-228, 2003]

And, also visually, referring to FIG. 2, systems developed at the University of Florida and at Penn State University 200 are based upon 2-D array of double-sided micro-fabricated silicon V grooves. Each single-mode fiber was placed in a silicon V-groove [1. J. Ge, D. et al., "Development of an Extremely Coherent Single Diode Fiber Bundle Array for High Contrast Imaging of Extrasolar Planets with Visible Terrestrial Planet Finder," SPIE 5491 New Frontiers in Stellar Interferometry, pp. 628-635, 2004]

SUMMARY OF THE PRESENT INVENTION

The present invention, the applications of which include, but are not limited to, high contrast nulling coronagraph interferometry, wavefront amplitude and/or phase control, wavefront compensation, wavefront sensing, free-space laser communications, adaptive optics, atmospheric compensation, synthetic aperture generation and augmentation of segmented telescopes, is a two-dimensional (2D) planar lightwave circuit spatial filter array that maintains spatial and temporal coherency of the light it transports.

A large coherent two-dimensional (2D) spatial filter array (SFA), 30 by 30 or larger, is produced by coupling a 2D planar lightwave circuit (PLC) array with a pair of lenslet arrays at the input and output side. The 2D PLC array is produced by stacking a plurality of chips, each chip with a plural number of straight PLC waveguides. A pupil array is coated onto the focal plane of the lenslet array. The PLC waveguides are produced by deposition of a plural number of silica layers on the silicon wafer, followed by photolithography and reactive ion etching (RIE) processes. A plural number of mode filters are included in the silica-on-silicon waveguide such that the PLC waveguide is transparent to the fundamental mode but higher order modes are attenuated by 40 dB or more.

The present invention, ideal for controlling optical wavefronts, comprises a two-dimensional (2-D) array of planar optical waveguides (forming a planar lightwave circuit, or PLC) flanked by two microlens arrays. The PLC array portion of the present invention is assembled to have hexagonal grid geometry so as to optimize the fill factor and optical throughput. All waveguides are precisely positioned by photolithography to precision align to the two microlens arrays.

One embodiment of the invention comprises an optical spatial filter array as a two dimensional planar lightwave circuit array, and first and second microlens arrays; the planar light waves circuit array is coupled to the first and second microlens arrays at an inlet and outlet respectively. The planar lightwave circuit array has a plurality of vertically stacked silicon wafer chips with each of the chips having a plurality of straight planar lightwave circuit waveguides. The planar lightwave circuit array may have a hexagonal grid geometry and maintains a spatial and temporal coherency of the transported light. The invention further involves a method of assembling an optical spatial filters array that includes the steps of preparing a plurality of chips from a silicon wafer, forming a plurality of straight planar lightwave circuit waveguides on each said chip to form a waveguide array of about a 30 by 30 array stacking a plurality of said chips and coupling a lenslet array at each of the inlet and the outlet of said waveguide array.

The present invention, as disclosed in detail herein, is designed to operate in the visible spectral range but can be modified to operate in the near infrared (IR) or other spectral ranges. The performance of the present invention can be characterized by parameters such as throughput, uniformity and spatial and temporal coherence.

BRIEF DESCRIPTION OF THE DRAWINGS

FIG. 4 shows the planar lightwave circuit and microlens array of the present invention.

FIGS. 5(a) and 5(b) shows PLC chips on an industry-standard silicon wafer before their separation.

FIGS. 10(*a*), (*b*), (*c*) and (*d*) shows pictures of the lenslet arrays, PLC array, mounts, and the iSFA prototype package. The complete iSFA prototype was tested in Luminit's laboratory.

DETAILED DESCRIPTION OF THE PRESENT INVENTION

Figure 1:
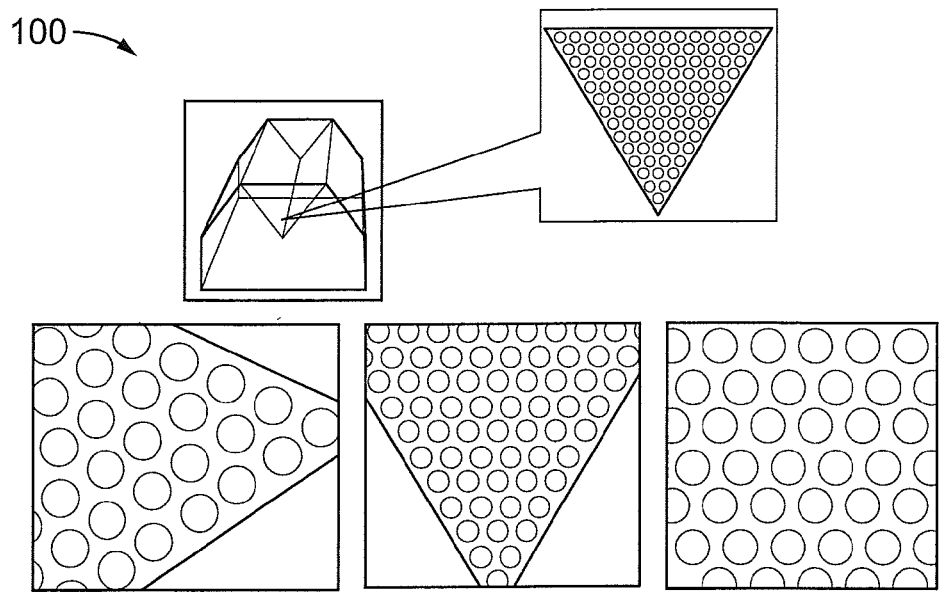
FIG. 1 is shows prior art from NASA.
Figure 2:
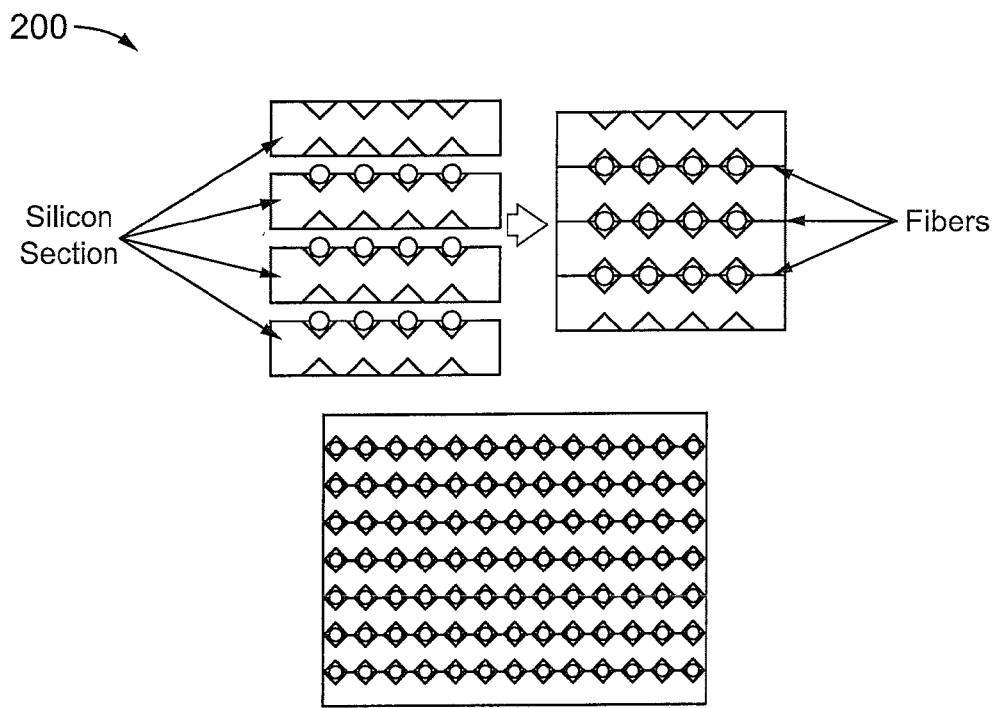
FIG. 2 is shows prior art from the University of Florida and Penn State University.
Figure 3:
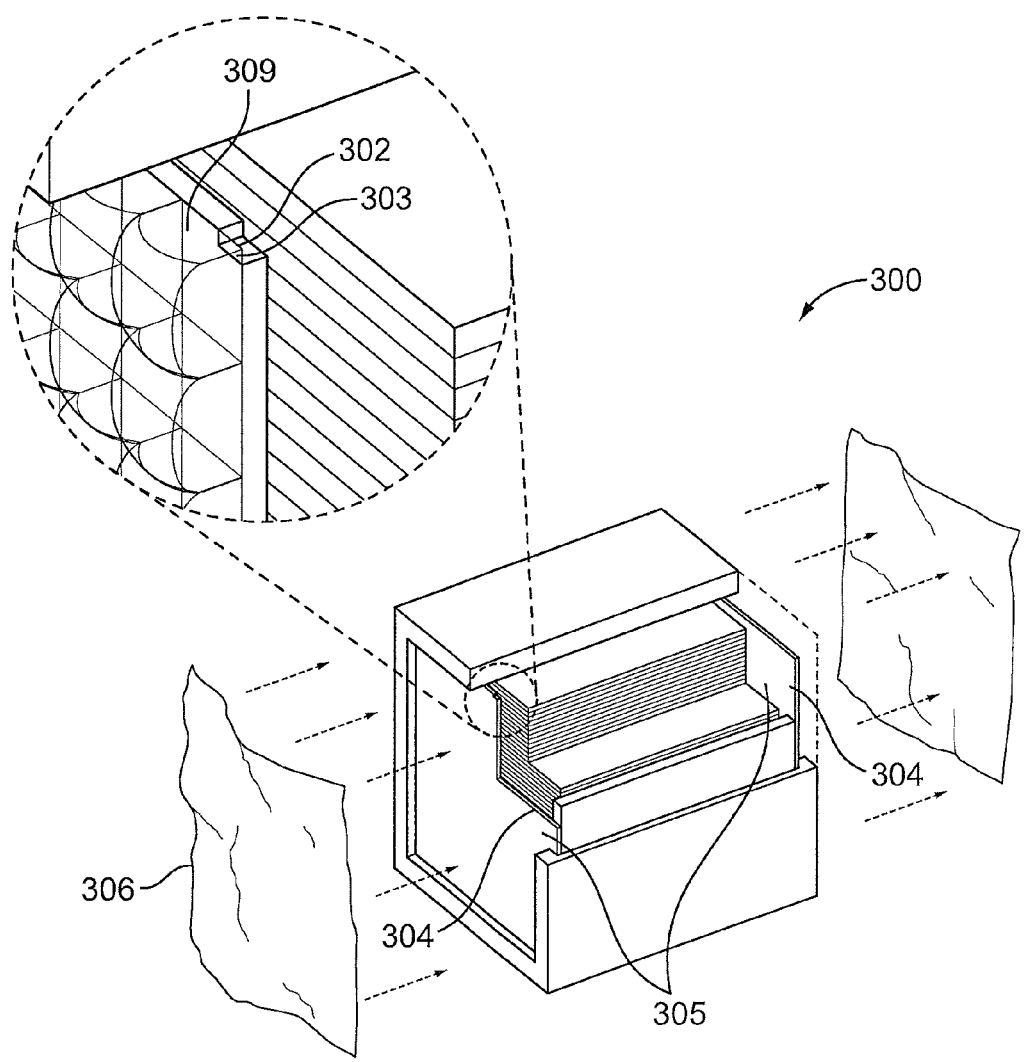
FIG. 3 is an overview of the present invention.

Referring to FIG. 3, an overview of one of the preferred embodiments of the present invention, 300, it can be seen that the primary purpose of the present invention is an optical wavefront control. The iSFA has a lenslet 301, a waveguide core 302 and a pupil 303. The lenslet 301 is mapped to a polarization preserving single mode channel. The iSFA 300 is bounded by the pupil array 301 within a microlens array 305. An incident wave front 306 with high frequency modulation passes through the iSFA and exits as a spatially filtered wave front 307 without high frequency modulation.

Referring to FIG. 4, the specific design of present invention, 400, the lenslet array 401 focuses and couples collimated light 404 into the PLC waveguide array 403. The beamlets propagate in the PLC array and couple out to the output lenslet array. The lenslet array has an AR coating on the curved surface and a pinhole array coating on the focal plane surface. The pinhole array 402 is used to reduce crosstalk between different waveguides.

The PLC array does not need to place or align each waveguide individually because all the waveguides are precisely positioned and aligned by a precision photomask and are mass-produced on a silicon wafer by photolithography. This is in contrast to a prior art fiber array where each fiber needs to be cut to the same length and placed and aligned individually. Thus, the PLC array offers many advantages over the prior art, particular for large arrays.

The PLC waveguide is similar to a prior art polarization maintaining (PM) fiber because the transverse electric (TE) and transverse magnetic (TM) modes of the PLC waveguide resemble the fast and slow axes of a PM fiber.

The PLC array does not need to align polarization orientations in relationship to each other. This is because the TM and TE modes of all the PLC waveguides in the array are inherently aligned with the vertical and horizontal directions. In contrast, it is more difficult to assemble a PM fiber array because each PM fiber must be rotated individually such that the polarization orientations of the fast and slow axes are aligned with the vertical and horizontal directions.

Figure 7A:
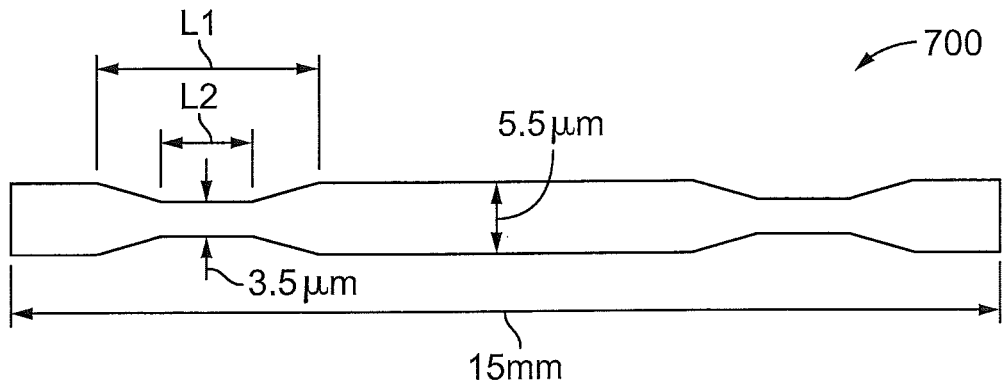
FIGS. 7(a) and 7(b) shows one aspect of the present invention, a shallow etched silica-on-silicon PLC waveguide with two mode filters.
Figure 7B:
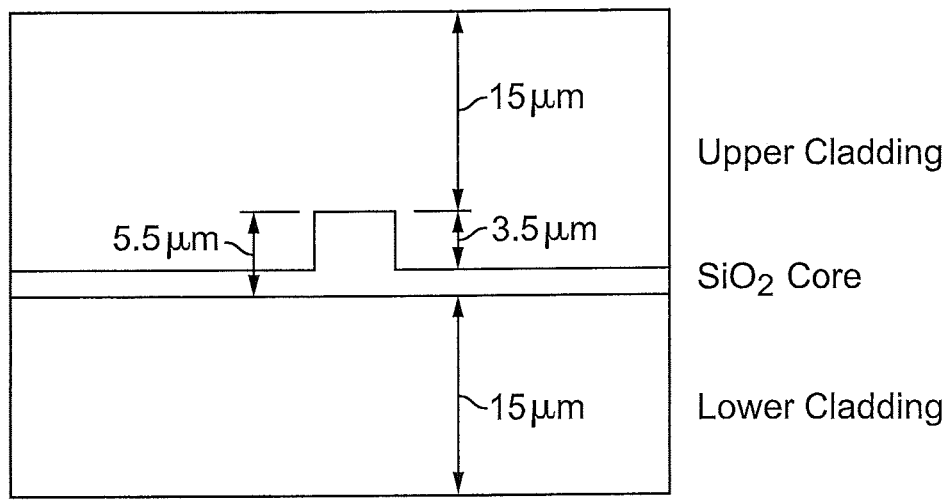
Figure 8:
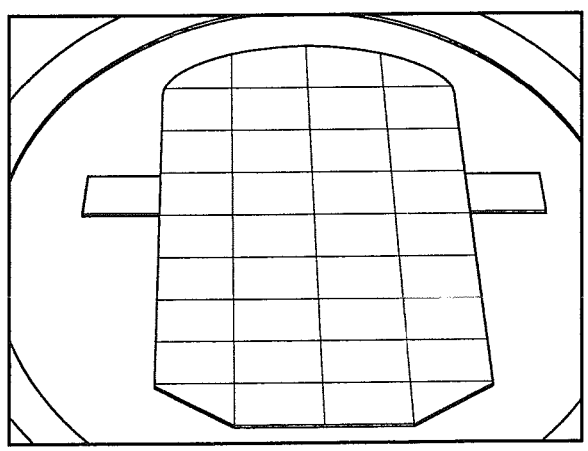
FIG. 8 shows chips that were fabricated and diced from a single silicon wafer. The chips were diced using a 100 μm dicing blade that has an alignment accuracy of ±50 μm. Each chip is 24.3 mm by 14.9 mm in size after dicing.

Referring to FIGS. 5(*a* and *b*), there is shown a mask layout of 30 chips on a 6 in. silicon wafer, 500. Each chip 501 is 24.4 mm by 15 mm in size and has 30 waveguides spaced by 0.8 mm. There is a margin of 0.4 mm on the left and 0.8 mm on the right side from the waveguide to the edge, thereby taking into account the hexagonal packing of the 2D PLC array. A cross section of the waveguide structure is shown in FIG. 7(*b*).

Figures 6A, 6B:
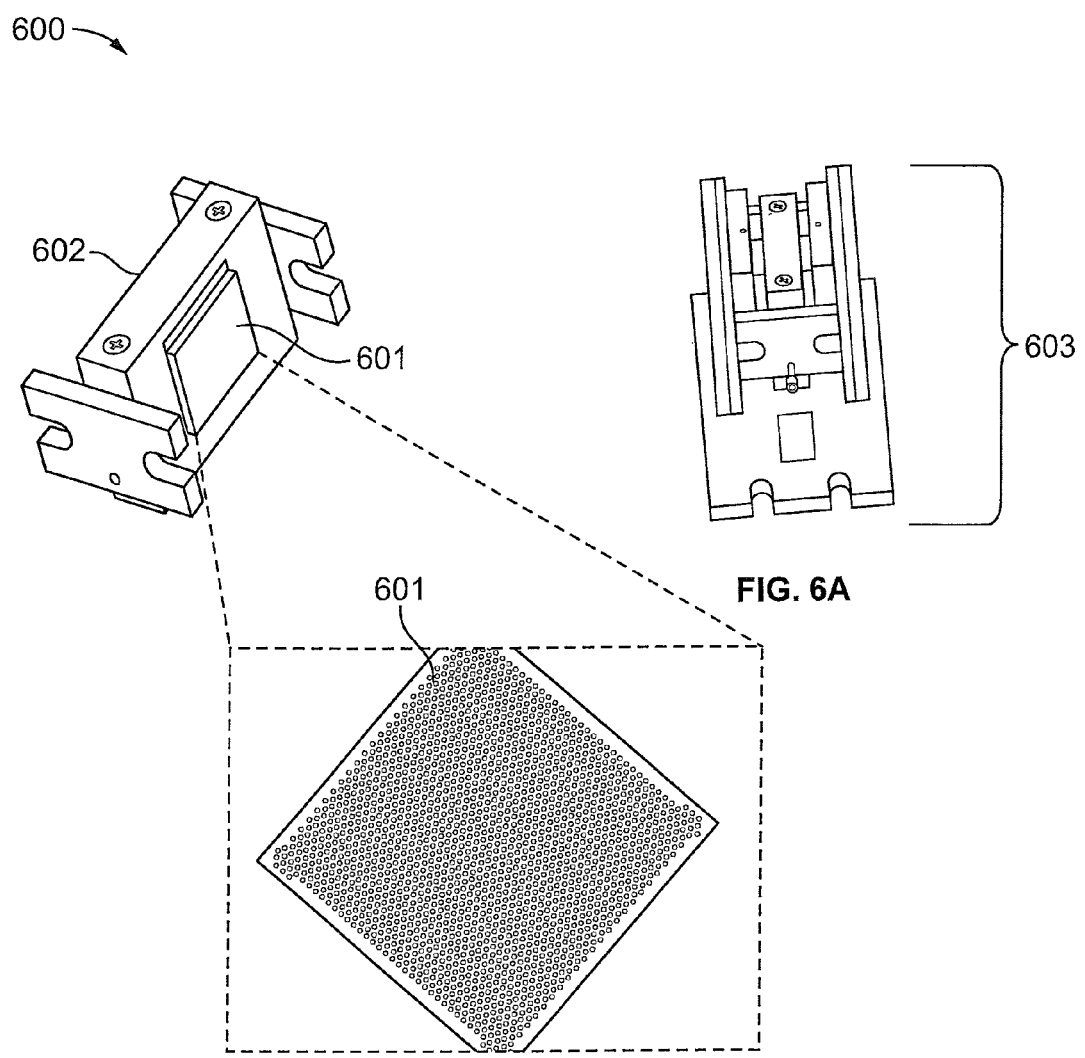
FIGS. 6(a) and 6(b) shows a preferred embodiment of the packaged invention.

Thus, as shown in FIGS. 6(*a* and *b*), a packaged array 600 comprises a 30 by 30 2D PLC array 601 formed by stacking 30 chips in the vertical direction. This 2D PLC array is housed in a mounting fixture 602 and a complete assembly 603, comprising the PLC and two (2) microlens arrays and forms a complete preferred embodiment of the present invention.

In telecommunications usage, a standard PLC waveguide is designed to operate at the 1.55 μm wavelength. The waveguide has a square core of 5.5×5.5 μm and the index step between the core and the cladding is 0.75%. Such a standard PLC waveguide supports only the fundamental single mode in the C-band, but becomes multi-mode in the visible 500 nm to 750 nm range.

There are two options to address this multi-mode issue: design a brand new single-mode waveguide or modify a standard C-band PLC waveguide to maintain single-mode operation in the visible 500 to 750 nm band. Designing a new waveguide with a reduced index step would require modifying the current fabrication process, which is risky and costly. Consequently, it was decided to modify the current C-band PLC to exploit its mature and less expensive fabrication process.

To determine the optimum parameters for the PLC waveguide and microlens arrays, one must take into account not only the coupling efficiency but also the phase delay in the input and output lenslets and the PLC waveguide. This requires that the variation in phase delay across the array must be much smaller than the coherence length of the light. The phase delay is calculated by computing the phase of the complex overlap integral between the microlens field and the PLC waveguide field. The coupling efficiency for the lenslet-PLC waveguide is calculated as the overlap integral of the lenslet field and the PLC waveguide field at the focal plane. The waveguide mode field is solved with a commercial mode solver tool and the microlens field with the optical design software ZEMAX. Then codes are developed and the coupling efficiency is calculated in MATLAB.

The buried PLC waveguide structure was modified to a ridge waveguide structure and two mode filters were added such that the C-band PLC waveguide maintains a single mode in the broad 0.4 μm to 1.7 μm wavelength range. The parameters of the PLC waveguide were simulated and optimized as follows:

Waveguide core thickness: 5.5 μm,
Waveguide core width: 5.5 μm,
Waveguide core index step: 0.75%,
Ridge etch depth: 3.5 μm,
Filter width: 3.5 μm,
Filter length: 1 mm,
Filter Taper length: 0.5 mm,
Number of filters: two.

Referring to FIGS. 7(*a* and *b*), the mode filter of the present invention 700 consists of two tapers separated by a single mode waveguide of a shallow etch depth of 3.5 μm. The length L1 and width of the single mode waveguide are optimized for small fundamental mode loss and large high order mode loss. Based on the results of optical simulations, two mode filters with filter width=3.5 μm and filter length L2=1000 μm or 1 mm were used, such that the loss of the higher order mode is 40 dB more than the loss of the fundamental mode. Beam propagation in the waveguide with two mode filters was simulated and the transmission spectra calculated in the 400 nm-1700 nm wavelength range using the beam propagation method (BPM). The simulation shows that the transmission is >80% for the fundamental mode (TE00 and TM00) from 400 nm-1700 nm, and <0.06% for the higher modes (TE01 and TE10). Thus, by including two mode filters in the standard PLC waveguide, the single-mode operation range is broadened to 400 nm-1700 nm coupling efficiency vs. wavelength pinhole diameter, transverse misalignment, angular misalignment, and radius of curvature (ROC) error was also simulated, as was phase delay vs. conic constant (CC) variation [3. Jun Ai, Fedor Dimov, Richard Lyon, Neven Rakuljic, Chris Griffo, Xiaowei Xia, Engin Arik, "Planar waveguide integrated spatial filter array", in Techniques and Instrumentation for Detection of Exoplanets VI, Stuart Shaklan, Editors, Proceedings of SPIE Vol. 8864 (SPIE, Bellingham, Wash. 2013), 88640V]. Based on these simulations and design trade-offs, the optimum structures and parameters for the PLC waveguides and the lenslet arrays was determined. The PLC waveguide mode field diameter (MFD) and the numerical aperture (NA) are designed to match with the Airy disc diameter and the NA of the microlens to provide an optimum coupling efficiency of ~80%.

Figures 9A, 9B:
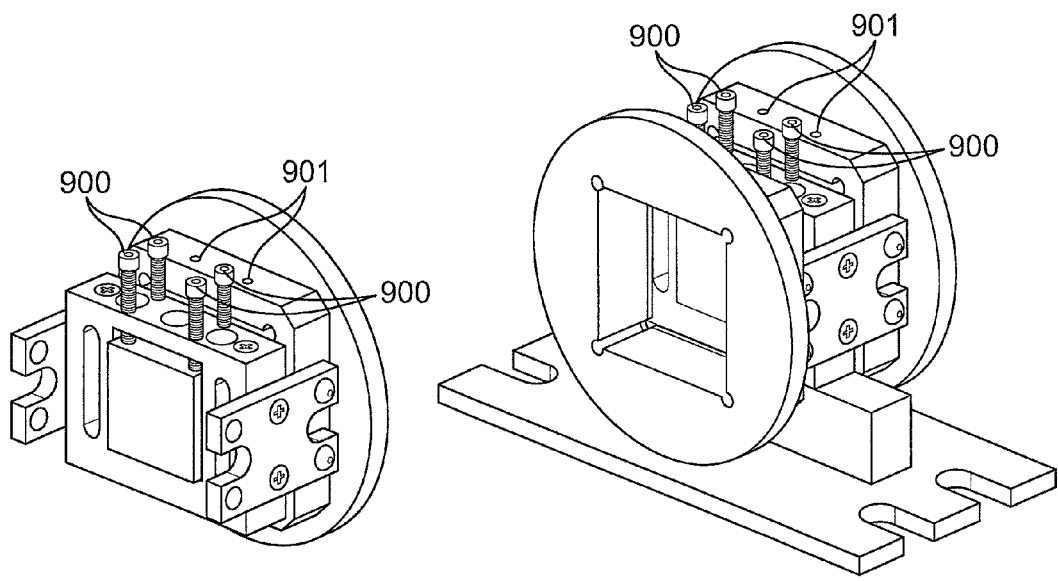
FIGS. 9(*a*), (*b*) and (*c*) shows a U-bracket to bond the 2D PLC array and align it with the microlens arrays (MLA). The four screws through the top plate are used for adjusting the roll and pitch orientations of the chip.
Figure 9C:
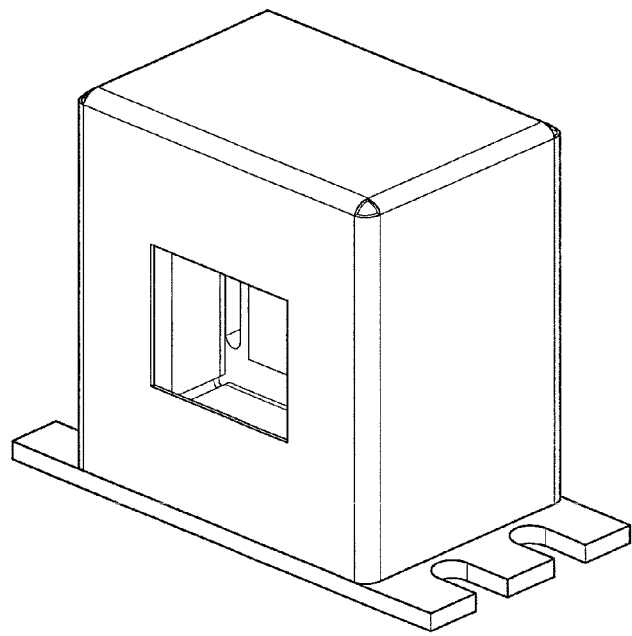

Referring, to FIG. 9(a-c) and FIG. 10(a-d), a U-bracket was designed and fabricated to bond the 2D PLC array and align it with the microlens arrays (MLA). The U-bracket was designed such that a pair of PLC chips can be precisely aligned in the transverse X-direction (horizontal, parallel to the pinholes plane) by slightly shifting the probes through the holes in both sides of the U-bracket. The four screws 900 through the top plate are used for adjusting the roll and pitch orientations of the chip. Three holes 901 on top are used for permanent bonding of the stack of the 2D PLC array, and for alignment monitoring using a laser beam.

Figure 11A:
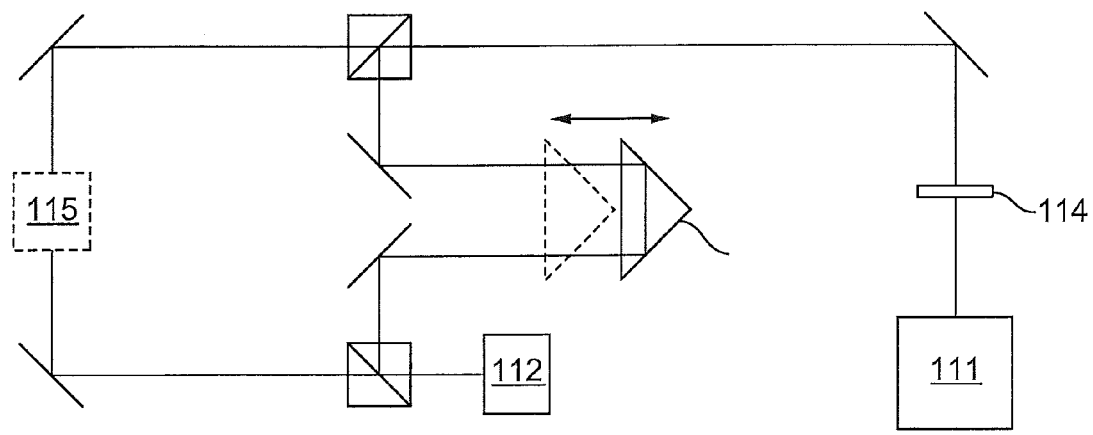
FIG. 11(*a*) shows the schematic and FIG. 11(*b*) shows the experimental Mach-Zehnder interferometer (MZI) setup that was designed and built for testing the coherence of the iSFA.
Figure 11B:
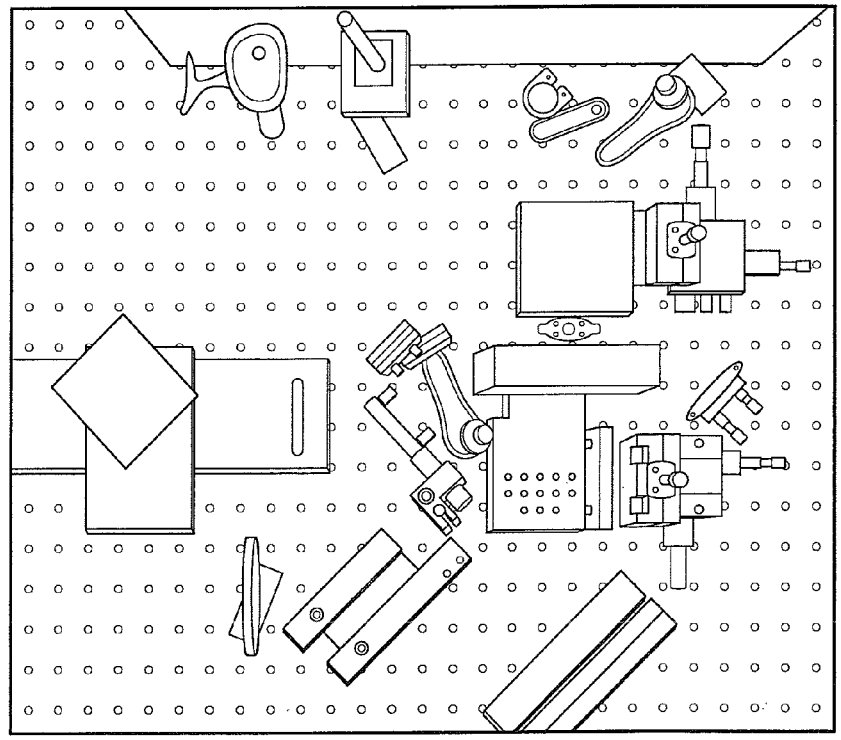

A Mach-Zehnder interferometer (MZI) was designed and built for testing the coherence of the iSFA as shown in FIGS. 11(a) and 11(b). The light passes the iSFA only once in the MZI, but twice (back and forth) in a Michelson interferometer. The MZI gives two outputs, and the total number of photons from each is conserved independent of anything else. However, a MZI is less forgiving than a Michelson in terms of tolerances and vibration since there are more optics and two separate beamsplitters, and generally the optics are further apart, meaning air currents/turbulence play a great role. The setup of FIG. 11(b) was first aligned using a helium-neon (HeNe) laser source.

A white light solar simulation source 111 was used together with a bandpass filter. The full width at half maximum of the filter used for the fringe patterns is about 19 nm. A series of fringe patterns were acquired by a CCD camera 112 while the retro-reflection prism 113 was shifted by a range that is equal to about the coherence length (Lc). Lc is determined by the central wavelength and the bandwidth of the bandpass filter 114. The entire image data were acquired, including the sequence of 128 fringe patterns without the iSFA 115 and the sequence of 128 fringe patterns with the iSFA. These data were processed to extract visibility changes with and without the iSFA and to obtain the path length difference between PLC waveguides.

The narrower the band, the easier it is to get fringes. Essentially, if the sequence of images picks a single pixel and plots that versus stepping the delay line (phase shifting prism), a modulated signal is seen and will damp out at the end of the plot. The visibility function will be, in general, complex, i.e., it will have a phase shift that depends on wavelength since a given iSFA channel will phase shift each wavelength slightly differently and modulate each wavelength differently. It is this function that is needed, because if the output beam is focused, it will be the cross-coherence of all the coherences from the individual channels. This controls how dark one can null to, and therefor this function must be known.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. An optical spatial filter array comprising a two dimensional planar lightwave circuit array, a first and a second microlens arrays, said planar light waves circuit array being coupled to said first and second microlens arrays at an inlet and outlet respectively, said planar lightwave circuit array comprising a plurality of vertically stacked silicon wafer chips, each of said chips having a plurality of straight planar lightwave circuit waveguides.

2. The optical spatial filter array of claim 1 wherein the planar lightwave circuit array has hexagonal grid geometry.

3. The optional spatial filters array of claim 1 wherein the two-dimensional planar lightwave circuit maintains a spatial and temporal coherency of the transported light.

4. A method of assembling an optical spatial filters array comprising the steps of:
  1) Preparing a plurality of chips from a silicon wafer;
  2) Forming a plurality of straight planar lightwave circuit waveguides on each said chip to form a waveguide array;
  3) Stacking a plurality of said chips and
  4) Coupling a lenslet array at each of the inlet and the outlet of said waveguide array.

5. The method of claim 4 wherein said waveguide array comprises at least a 30 by 30 array.

* * * * *